United States Patent
Kanada et al.

(10) Patent No.: US 6,600,629 B2
(45) Date of Patent: Jul. 29, 2003

(54) THIN FILM MAGNETIC HEAD HAVING GAP LAYER MADE OF NIP AND METHOD OF MANUFACTURING THE SAME

(75) Inventors: Yoshihiro Kanada, Niigata-ken (JP); Hisayuki Yazawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/005,067

(22) Filed: Dec. 3, 2001

(65) Prior Publication Data

US 2002/0071207 A1 Jun. 13, 2002

(30) Foreign Application Priority Data

Dec. 7, 2000 (JP) ........................ 2000-372853

(51) Int. Cl.$^7$ ............................ G11B 5/147; G11B 5/235
(52) U.S. Cl. ........................ 360/120; 360/126
(58) Field of Search ..................... 360/126, 119, 360/120

(56) References Cited

U.S. PATENT DOCUMENTS

| | | | |
|---|---|---|---|
| 5,285,340 A | | 2/1994 | Ju et al. |
| 6,018,862 A | | 2/2000 | Stageberg et al. |
| 6,151,193 A | * | 11/2000 | Terunuma et al. .......... 360/126 |
| 6,163,436 A | | 12/2000 | Sasaki et al. |
| 6,456,461 B1 | * | 9/2002 | Sato .......................... 360/126 |
| 6,477,006 B1 | * | 11/2002 | Sato .......................... 360/126 |
| 6,515,825 B1 | * | 2/2003 | Sato .......................... 360/126 |

* cited by examiner

*Primary Examiner*—Robert S. Tupper
(74) *Attorney, Agent, or Firm*—Brinks Hofer Gilson & Lione

(57) ABSTRACT

A gap layer is formed by electroplating NiP using a pulsed current. This can suppress crystallization of Ni due to epitaxial growth near the interface of the gap layer. Therefore, a large amount of nonmagnetic element such as P can be contained, and the vicinity of the interface can be put into an amorphous state to improve corrosion resistance.

5 Claims, 12 Drawing Sheets

THIN FILM MAGNETIC HEAD HAVING GAP LAYER MADE OF NIP AND METHOD OF MANUFACTURING THE SAME

BACKGROUND OF THE INVENTION

1. Field of the Invention

The present invention relates to a magnetic recording element mounted on, for example, a hard disk device or the like, and particularly to a thin film magnetic head which can be improved in corrosion resistance, smoothness and demagnetization near the interface between a gap layer and a lower pole layer (or a lower core layer), and a method of manufacturing the thin film magnetic head.

2. Description of the Related Art

FIG. 14 is a partial front view showing the structure of a conventional thin film magnetic head.

In FIG. 14, reference numeral 1 denotes a lower core layer made of a magnetic material such as permalloy or the like, an insulating layer 9 being formed on the lower core layer 1.

The insulating layer 9 has a trench 9a formed in the height direction (the Y direction shown in the drawing) from a surface facing a recording medium to have an internal width dimension corresponding to a track width Tw.

In the trench 9a, a lower pole layer 2 magnetically connected to the lower core layer 1, a gap layer 4, and an upper pole layer 5 magnetically connected to an upper core layer 6 are formed by plating in turn from the bottom. Furthermore, the upper core layer 6 is formed on the upper pole layer 5 by plating.

Furthermore, a coil layer (not shown in the drawing) is patterned in a spiral shape on the portion of the insulating layer 9, which is behind the trench 9a formed in the insulating layer 9 in the height direction (the Y direction).

In the inductive head shown in FIG. 14, when a recording current is supplied to the coil layer, a recording magnetic field is induced in the lower core layer 1 and the upper core layer 6. As a result, a magnetic signal is recorded on a recording medium such as a hard disk or the like by a leakage magnetic field from the gap between the lower pole layer 2 and the upper pole layer 5 magnetically connected to the lower core layer 1 and the upper core layer 6, respectively.

The gap layer 4 is made of, for example, NiP which can be plated. A NiP film is conventionally formed by electroplating using a DC current.

However, it was found that when the NiP film was grown from the interface with the lower pole layer 2 by electroplating with a DC current, the content of element P was very low near the interface. For example, it was found from the experimental results described below that the content of element P was less than 8% by mass within a distance of about 2.5 nm from the interface in the thickness direction.

In electroplating with a DC current, the density of the current supplied to the NIP film during plating has a nonuniform distribution, and the current concentrates in a certain plating surface and continuously flows through the surface. The nonuniform current distribution possibly causes a significant decrease in the content of element P near the interface because element Ni, which easily produces lattice matching with the crystalline lower pole layer 2, is epitaxially grown and crystallized. Also, the epitaxial growth of Ni worsens surface roughness at the interface.

The above-described NIP film having a very low content of element P near the interface and surface roughness exhibits low corrosion resistance and low resistance to neutral to alkali aqueous solutions. Therefore, the NIP film is readily corroded with a cleaning liquid used in the cleaning step of a slider manufacturing process to cause the problem of cracking, as shown in FIG. 15 (schematic drawing). Thus, recording properties such as an overwrite performance deteriorate.

Also, when the content of element P is decreased near the interface, the vicinity of the interface is readily magnetized, and thus the gap length G1 determined by the thickness of the gap layer 4 varies, thereby failing to manufacture a thin film magnetic head having predetermined recording properties in high yield.

SUMMARY OF THE INVENTION

Accordingly, the present invention has been achieved for solving the above problem, and an object of the present invention is to provide a thin film magnetic head which is increased in the content of element P near the interface to improve corrosion resistance and smoothness of a gap layer and promote demagnetization at the interface, as compared with a conventional magnetic head.

Another object of the present invention is to provide a method of manufacturing a thin film magnetic head which comprising forming a gap layer by electroplating with a pulsed current to suppress crystallization of element Ni due to epitaxial growth near the interface and increase the content of a nonmagnetic element (for example, element P).

In order to achieve the objects of the present invention, a thin magnetic element comprises a lower core layer, a gap layer formed on the lower core layer directly or through a lower pole layer, and an upper core layer formed on the gap layer directly or through an upper pole layer which determined a track width, wherein the gap layer is formed by plating NiP, and the content of element P is 8% by mass to 15% by mass within a distance of 10 nm from the interface with the lower pole layer or the lower core layer in the thickness direction.

Therefore, the gap layer does not have a region in which Ni is crystallized by epitaxial growth from the interface with the lower pole layer or the lower core layer in the thickness direction. Thus, in the present invention, the vicinity of the interface is in an amorphous state containing 8% by mass to 15% by mass of element P, while in a conventional magnetic head, Ni is crystallized.

In this way, the interface is brought into the amorphous state containing more element P than the conventional magnetic head, thereby improving corrosion resistance and smoothness of the gap layer. Therefore, the gap layer is not corroded with a cleaning liquid used in a cleaning step of a slider manufacturing process, and thus the problem of cracking the gap layer can be prevented, unlike the conventional magnetic head. Furthermore, the region within a distance of 10 nm from the interface in the thickness direction contains 8% by mass to 15% by mass of element P, and thus the region can be demagnetized, thereby permitting high-yield manufacture of a thin film magnetic element with a predetermined value of gap length G1.

In the present invention, the content of element P is preferably 8% by mass to 15% by mass within a distance of 40 nm from the interface.

In the present invention, the content of element P is preferably 10% by mass to 15% by mass, and more preferably 11% by mass to 15% by mass.

With the content of element P within the above range, crystallization of element Ni by epitaxial growth can be further suppressed to further improve corrosion resistance of the gap layer, and promote demagnetization near the interface of the gap layer, thereby permitting manufacture of a thin film magnetic head having good recording properties.

In the present invention, the average content of element P of the gap layer over its entire thickness is preferably 11% by pass to 15% by mass.

By controlling not only the content of element P within the distance of at least 10 nm, preferably 40 nm, from the interface, but also the average content of element P of the gap layer over its entire thickness within the above-described ranges, the corrosion resistance of the entire gap layer can be improved, and demagnetization of the entire gap layer can be promoted, thereby enabling the secure occurrence of a leakage magnetic field neat the gap layer.

The content of element P is measured by using an X-ray analysis apparatus. Since only a relative value of the content of element P can be obtained by the X-ray analysis apparatus, the content of element P obtained by the X-ray analysis apparatus is corrected to an absolute value by wet analysis. The thus-obtained value is the content of element P of the present invention.

The distance from the interface with the lower pole layer or the lower core layer is measured by using a transmission electron microscope (TEM).

In another aspect of the present invention, a method of manufacturing a thin film magnetic head, which comprises a lower core layer made of a magnetic material, and an upper core layer made of a magnetic material and opposed to the lower core layer with a gap layer provided therebetween at a surface facing a recording medium, comprises the steps of (a) forming the lower core layer by plating, (b) forming the nonmagnetic gap layer mainly composed of Ni, by electroplating with a pulsed current, directly on the lower core layer or on a lower pole layer formed on the lower core layer by plating, and (c) forming the upper core layer on the gap layer directly or through an upper pole layer by plating.

As described above, the gap layer is conventionally formed by electroplating with a DC current. However, this method causes a nonuniform current density distribution, and thus causes the current to concentrate in a certain plating surface and continuously flow through the plating surface. The nonuniform current distribution causes crystallization of Ni due to epitaxial growth near the interface with the lower pole layer or the lower core layer. As a result, the content of a nonmagnetic element (for example, element P) near the interface is abruptly decreased to deteriorate corrosion resistance and demagnetization of the vicinity of the interface.

Therefore, the present invention uses electroplating using a pulsed current instead of the DC current.

Namely, a current control element is repeatedly turned on and off to provide a time to pass the current, and a null time to pass no current. By providing the null time to pass no current, the nonuniformity of the current density distribution in plating can be ameliorated to slowly form the gap layer, as compared with a conventional electroplating with the DC current.

Therefore, crystallization of Ni due to epitaxial growth near the interface is suppressed to permit the plating formation of the gap layer in an amorphous state containing a proper amount of a nonmagnetic element near the interface. Therefore, the gap layer having excellent corrosion resistance and smoothness can be formed, and demagnetization near the interface can be promoted.

In the present invention, in the step (b), preferably, the gap layer is first formed by plating to a predetermined thickness using a pulsed current having a predetermined current density, and then the residue of the gap layer is formed by plating with a pulsed current having a higher current density than the predetermined current density.

As described above, the current density in plating is first low at the interface to slow down growth by plating, thereby suppressing crystallization of Ni due to epitaxial growth to form an amorphous state containing a proper amount of a nonmagnetic element. Then, the current density is increased to speed up growth by plating, thereby permitting the formation of the gap layer within a short time. In the stage in which the current density is increased, the gap layer, which has been formed by plating growth with the low current density, is in the amorphous state, and thus the gap layer to be formed on the amorphous gap layer by plating growth with the increased current density is also in the amorphous state while containing a proper amount of nonmagnetic element. Therefore, in the present invention, the whole gap layer can be put into the amorphous state containing a proper amount of nonmagnetic element.

In the present invention, the predetermined current density is 1.5 mA/cm$^2$ to 3.0 mA/cm$^2$, and the pulsed current having this current density is preferably used for forming the gap layer by plating up to a thickness of 10 nm.

In the present invention, more preferably, the gap layer is first formed by plating to a thickness of 40 nm.

With the current density in the above numerical range, the gap layer is slowly grown by plating near the interface to form an amorphous film containing a proper amount of nonmagnetic element, thereby appropriately suppressing crystallization of element Ni due to epitaxial growth. With the current density lower than the above value, the plating growth rate is excessively low, and thus the gap layer is undesirably little grown by plating. While with the current density higher than the above value, the plating growth rate is excessively high, and thus the nonmagnetic element is less contained in the film to undesirably cause crystallization of Ni.

When the gap layer is formed by plating NiP, the content of element P in the film of 10 nm thick can be set to 8% by mass to 15% by mass. Preferably, the content of element P in the film of 40 nm thick can be set to 8% by mass to 15% by mass.

In the present invention, the residue of the gap layer is preferably formed by plating with the pulsed current having a current density of 8.5 mA/cm$^2$ to 11.0 mA/cm$^2$. In plating the residue of the gap layer, the current density is increased from the initial current density to speed up plating growth, thereby permitting the formation of the gap layer within a short time. Even when the residue of the gap layer is formed by plating with the pulsed current having the high current density, the gap layer previously formed is amorphous, and thus the residue of the gap layer can be formed in the amorphous state containing a proper amount of nonmagnetic element. When the gap layer is composed of NiP, the average content of element P of the gap layer over its entire thickness can be set to 11% by mass to 15% by mass.

In the present invention, the gap layer is formed by plating any one of Ni—P, Ni—W, Ni—P—Mo, and Ni—P—W.

Namely, the electroplating process using the pulsed current can suppress crystallization of Ni due to epitaxial growth near the interface, permitting the plating formation of the gap layer having excellent corrosion resistance and smoothness, and improved demagnetization.

DESCRIPTION OF THE PREFERRED EMBODIMENTS

Figure 1:
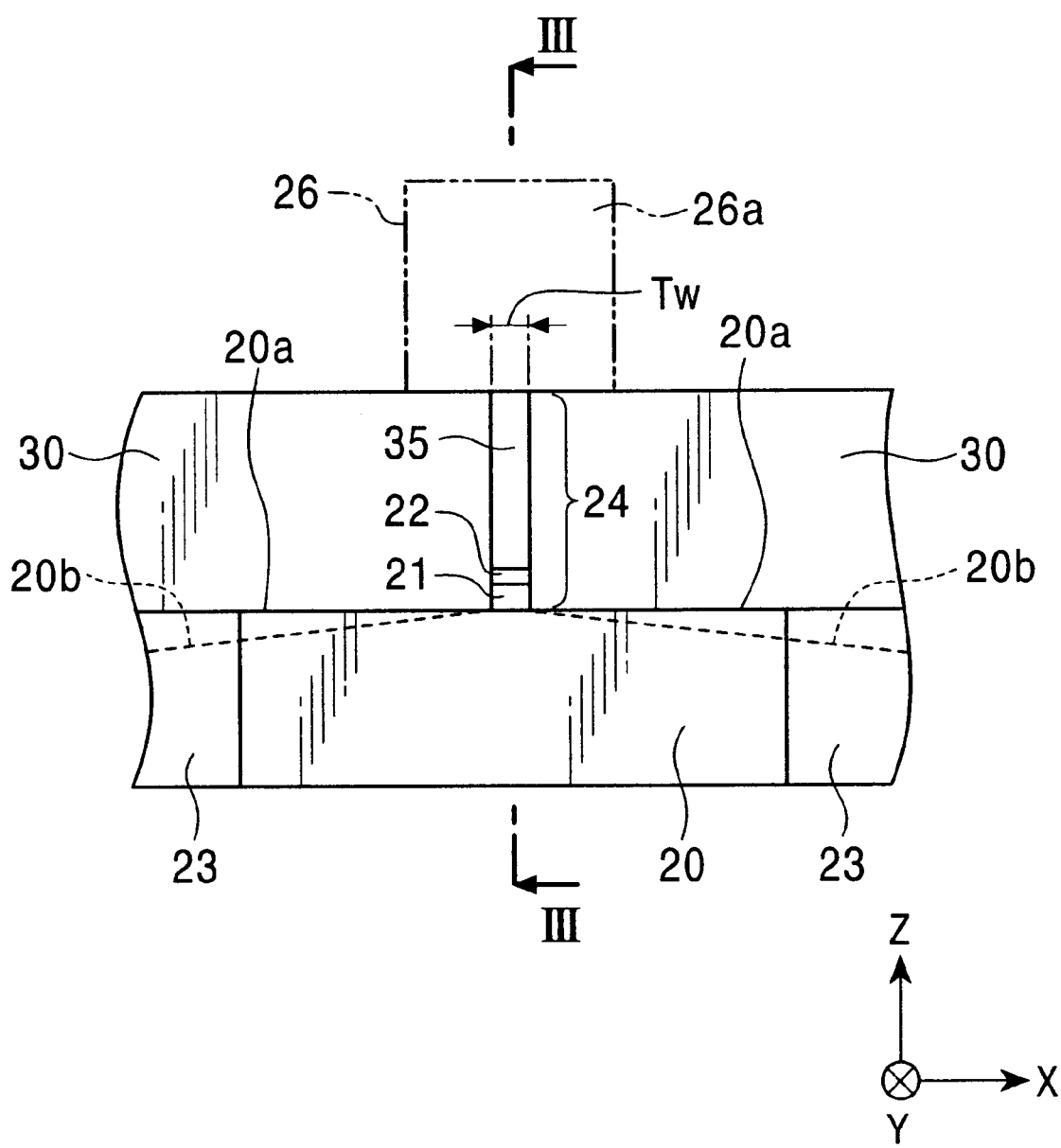
FIG. 1 is a front view showing a thin film magnetic head according to a first embodiment of the present invention.
Figure 2:
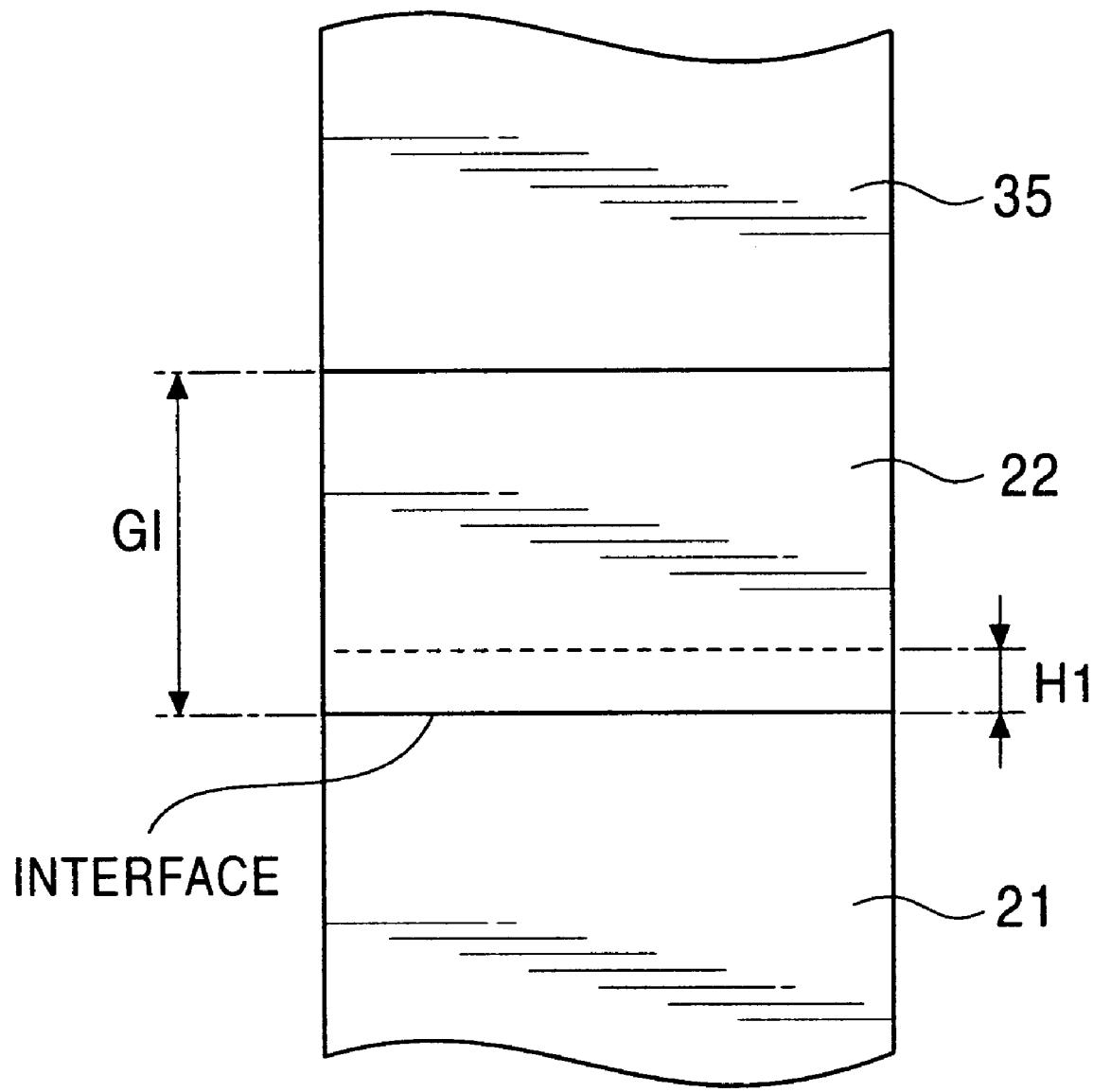
FIG. 2 is an enlarged partial view of a pole portion.
Figure 3:
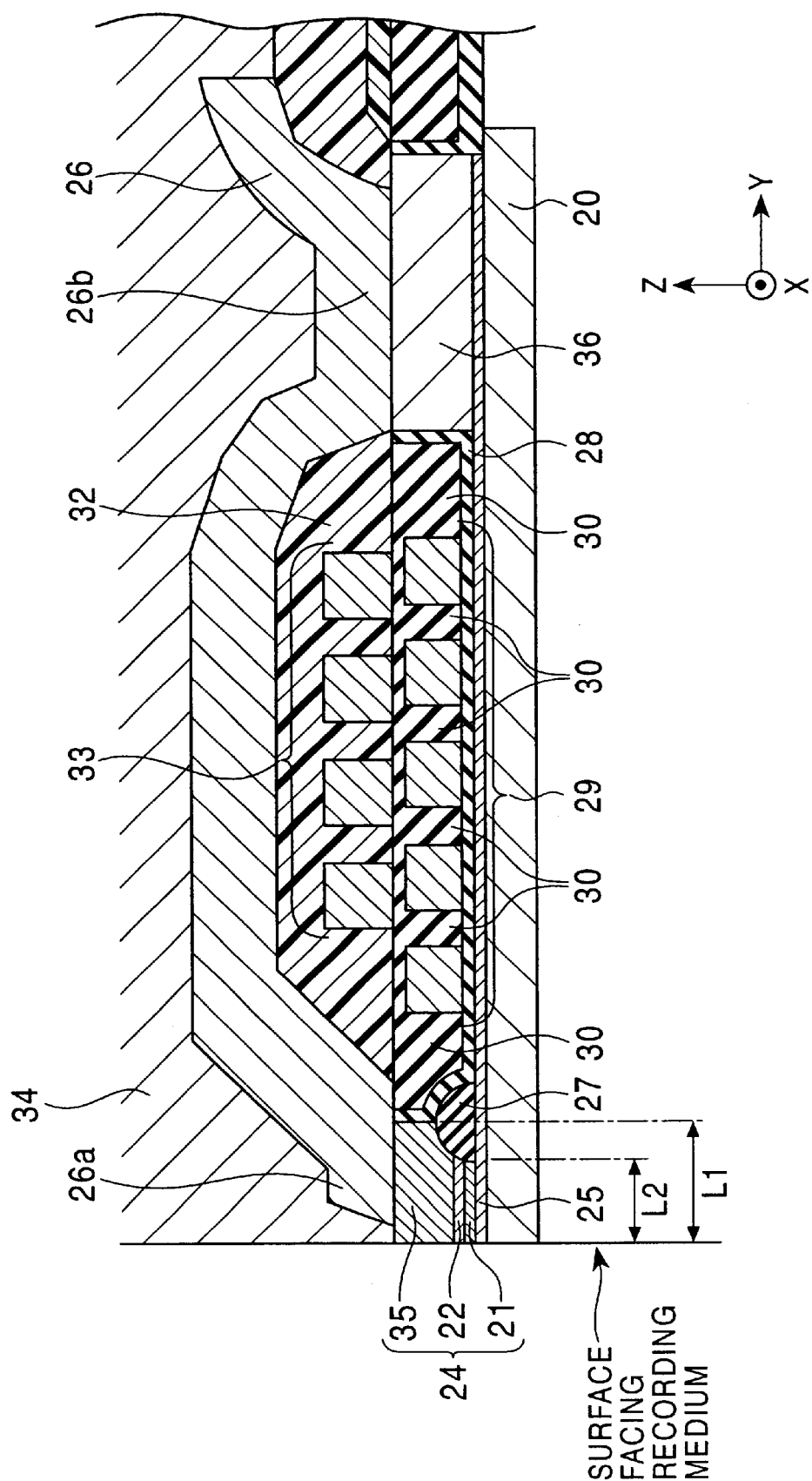
FIG. 3 is a partial sectional view of the thin film magnetic head taken along line III—III in FIG. 1.

FIG. 1 is a partial front view showing the structure of a thin film magnetic head according to an embodiment of the present invention, FIG. 2 is an enlarged partial view of a pole portion, and FIG. 3 is a partial sectional view of the thin film magnetic head taken along line III—III in FIG. 1, as viewed from the direction shown by arrows.

Although the thin film magnetic head shown in FIG. 1 is a recording inductive head, in the present invention, a reproducing head (MR head using so-called AMR, GMR, or TMR) utilizing a magnetoresistive effect may be laminated below the inductive head.

In FIG. 1, reference numeral 20 denotes a lower core layer made of a magnetic material, for example, permalloy. When the reproducing head is laminated below the lower core layer 20, a shield layer may be provided separately from the lower core layer 20, for protecting the magnetoresistive element from noise, or the lower core layer 20 may also be used as an upper shield layer of the reproducing head without the shield layer.

Referring to FIG. 1, insulating layers 23 are formed on both sides of the lower core layer 20. As shown in FIG. 1, the upper surface 20a of the lower core layer 20, which extend from the base end of the lower pole layer 21, may be formed to extend in parallel to the track width direction (the X direction shown in FIG. 1). Alternatively, inclined surfaces 20b may be formed to be inclined away from the upper core layer 26. By forming the inclined surfaces 20b at the top of the lower core layer 20, the occurrence of side fringing can be appropriately decreased.

As shown in FIG. 1, a pole portion 24 is formed on the lower core layer 20 so as to be exposed at the surface facing a recording medium. In this embodiment, the pole portion 24 is a so-called track width controlling portion which is formed with the track width Tw. The track width Tw is preferably 0.7 µm or less, and more preferably 0.5 µm or less.

In the embodiment shown in FIG. 1, the pole portion 24 has a three-layer laminated structure comprising the lower pole layer 21, a gap layer 22 and an upper pole layer 35. The pole layers 21 and 35 and the gap layer 22 will be now described below.

As shown in FIG. 1, the lower pole layer 21 is formed as the lowermost layer by plating on the lower core layer with a plating underlying layer 25 provided therebetween (refer to FIG. 3). The lower pole layer 21 is magnetically connected to the lower core layer 20, and may be made of a material the same as or different from the lower core layer 20. Also, the lower pole layer 21 may comprise a single layer film or a multilayer film. The height dimension of the lower pole layer 21 is, for example, about 0.3 µm.

Furthermore, the nonmagnetic gap layer 22 is laminated on the lower pole layer 21. In the present invention, the gap layer 22 is made of a nonmagnetic metal material, and formed by plating on the lower pole layer 21. The height dimension of the gap layer 22 is, for example, about 0.2 µm.

Then, the upper pole layer 35 is formed by plating on the gap layer 22 to be magnetically connected to the upper core layer 26 which will be described below. The upper pole layer 35 may be made of the same or different material as or from the upper core layer 26. Also, the upper pole layer 35 may comprise either a single layer film or a multilayer film. The height dimension of the upper pole layer 35 is, for example, about 2.4 µm to 2.7 µm.

As described above, when the gap layer 22 is formed by plating a metal material NiP, the lower pole layer 21, the gap layer 22 and the upper pole layer 35 can be continuously formed by plating.

In the present invention, the pole portion 24 is not limited to the three-layer laminated structure, and the pole portion 24 may comprise two layers including the gap layer 22 and the upper pole layer 35.

As described above, the lower pole layer 21 and the upper pole layer 35 may be made of the same or different materials as or from the core layers to which both pole layers are respectively magnetically connected. However, in order to increase the recording density, the lower pole layer 21 and the upper pole layer 35 opposed to the gap layer preferably have higher saturation magnetic flux densities than those of the core layers to which both pole layers are respectively magnetically connected. With the lower pole layer 21 and the upper pole layer 35 having higher saturation magnetic flux densities, a recording magnetic field can be concentrated in the vicinity of the gap to improve the recording density.

In the present invention, the gap layer 22 is formed by plating NiP. As shown in FIG. 2, the content of element P within a thickness H1 of 10 nm from the interface with the lower pole layer 21 is set to 8% by mass to 15% by mass. Preferably the content of element P within a thickness H1 of 40 nm is set to 8% by mass to 15% by mass.

As shown in FIG. 2, the interface between the gap layer 22 and the lower pole layer 21 is smoothed, and the gap layer is put into an amorphous state containing element P at the above-described content within the thickness H1.

Figure 15:
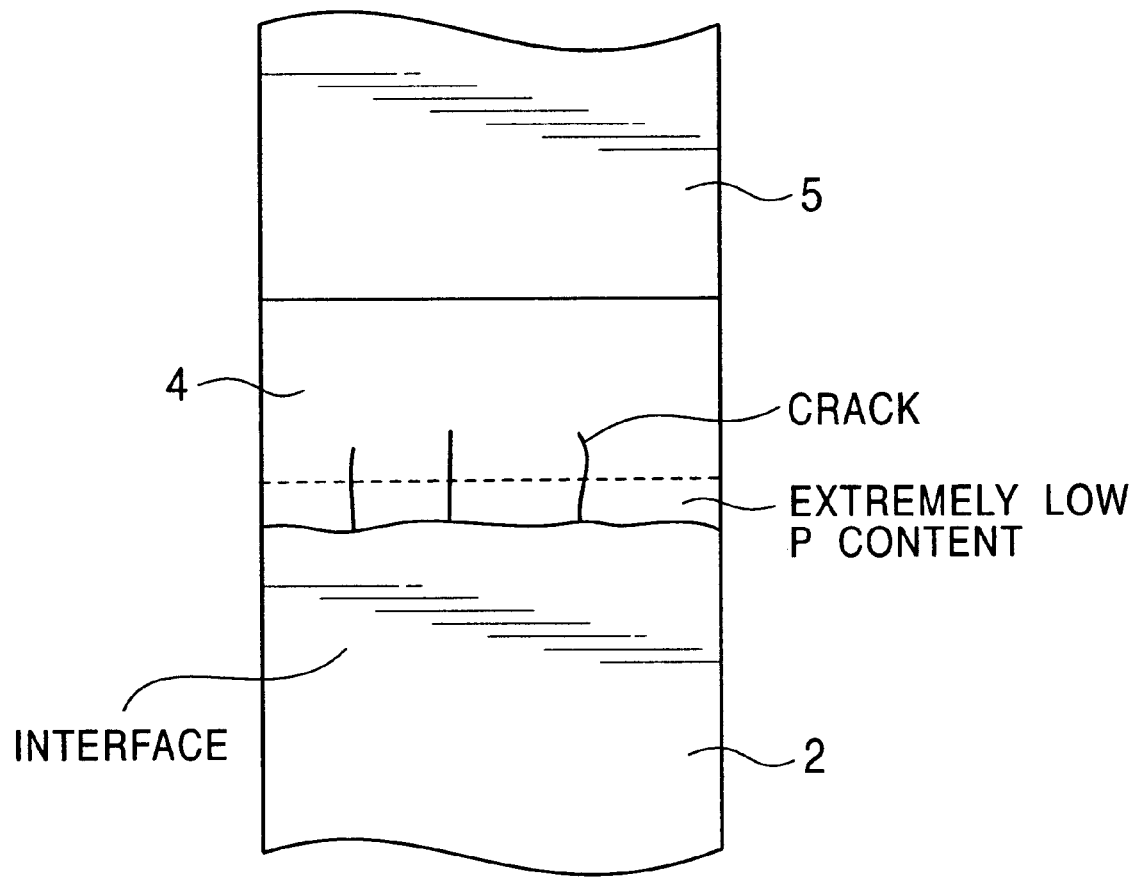
FIG. 15 is an enlarged view of a pole portion for explaining the problem of a conventional thin film magnetic head.

In the present invention, the content of element P is high near the interface as compared with a conventional magnetic head, and the gap layer 22 is formed by plating in an amorphous state containing a proper amount of element P, thereby improving corrosion resistance and smoothness of the gap layer 22 near the interface. Therefore, in the present invention, even when the gap layer 22 is exposed to a neutral or alkali cleaning liquid used in the cleaning step of a slider processing process, the gap layer 22 is not corroded, and thus not cracked, unlike a conventional magnetic head (refer to FIG. 15).

Since the gap layer 22 also contains a proper amount of element P near the interface thereof, demagnetization of the vicinity of the interface can be promoted. The gap length G1 is determined by the thickness of the gap layer 22, but the gap length G1 can be maintained in a predetermined value range by appropriately demagnetize the vicinity of the interface of the gap layer 22.

In the present invention, therefore, recording properties such as the overwrite performance of the thin film magnetic head can be maintained in a good state, and the thin film magnetic head having predetermined recording properties can be manufactured in high yield.

The content of element P is measured by an X-ray analysis apparatus. However, the content of element P is measured as a relative value by the X-ray analysis apparatus, and wet analysis is performed after measurement by the X-ray analysis apparatus in order to correct the measured value to an absolute value. The thus-obtained value is the measured value of the content of element P.

The distance from the interface is measured by using a transmission electron microscope (TEM).

In the present invention, the content of element P within a thickness of 10 nm, preferably a thickness of 40 nm, from the interface is preferably 10% by mass to 15% by mass. The content of element P is more preferably 11% by mass to 15% by mass.

With the content of element P within the above range, crystallization of Ni within the thickness H1 from the interface with the gap layer 22 comprising the NiP film can be suppressed to promote the formation of the amorphous film, thereby improving corrosion resistance and smoothness, and further promoting demagnetization. Therefore, the problem of cracking does not occur near the interface with the gap layer 22, and thus a thin film magnetic head having excellent recording performance can be produced.

In the present invention, the average content of element P of the gap layer 22 over its entire thickness is preferably 11% by mass to 15% by mass. With this content of element P of the gap layer 22 over its entire thickness, corrosion resistance of the gap layer 22 over its entire thickness can be improved, and demagnetization can also be promoted. Therefore, the whole gap layer 22 can be appropriately protected from corrosion with a cleaning liquid or the like, and a leakage magnetic field can securely be produced near the gap.

In the present invention, as shown in FIG. 3, the pole portion 24 is formed with length dimension L1 in the height direction (the Y direction shown in the drawing) from the surface (ABS) facing the recording medium. In addition, a Gd-determining layer 27 made of, for example, an organic insulating material is formed between the pole portion 24 and the lower core layer 20. The distance from the tip of the Gd-determining layer 27 to the surface (ABS) facing the recording medium is L2 which corresponds to the gap depth (Gd).

As shown in FIG. 3, a coil layer 29 is spirally formed on the lower core layer 20 through an insulating underlying layer 28 provided therebetween so as to be located behind the pole portion 24 in the height direction (the Y direction). The insulating underlying layer 28 is preferably made of, for example, at least one insulating material of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

The pitch intervals of the conductor of the coil layer 29 are filled with an insulating layer 30. The insulating layer preferably comprises at least one selected from AlO, $Al_2O_3$, $SiO_2$, $Ta_2O$, TiO, AlN, AlSiN, TiN, SiN, $Si_3N_4$, NiO, WO, $WO_3$, BN, CrN, and SiON.

As shown in FIG. 1, the insulating layer 30 is formed on both sides of the pole portion 24 in the track width direction (the X direction shown in the drawing) to be exposed at the surface facing the recording medium.

Referring to FIG. 3, a second coil layer 33 is spirally formed on the insulating layer 30.

As shown in FIG. 3, the second coil layer 33 is covered with an insulating layer 32 made of an organic material such as resist, polyimide, or the like, and the upper core layer 26 made of a NiFe alloy or the like is patterned on the insulating layer 32 by, for example, a frame plating process or the like.

As shown in FIG. 3, the tip portion 26a of the upper core layer 26 is magnetically connected to the upper pole layer 35, and the base end 26b of the upper core layer 26 is magnetically connected to a raised layer 36 formed on the lower core layer 20 and made of a magnetic material such as a NiFe alloy. The raised layer 36 is not necessarily required. In this case, the base end 26b of the upper core layer 26 is connected directly to the lower core layer 20. The upper core layer 26 is coated with a protecting layer 34 made of $Al_2O_3$ or the like.

As shown in FIG. 1, the width dimension at the end of the upper core layer 26, which is connected to the upper pole layer 35, is larger than that of the upper pole layer 35 in the track width direction. This can cause a magnetic flux from the upper core layer 26 to efficiently flow to the upper pole layer 35, thereby improving the recording performance.

Figure 4:
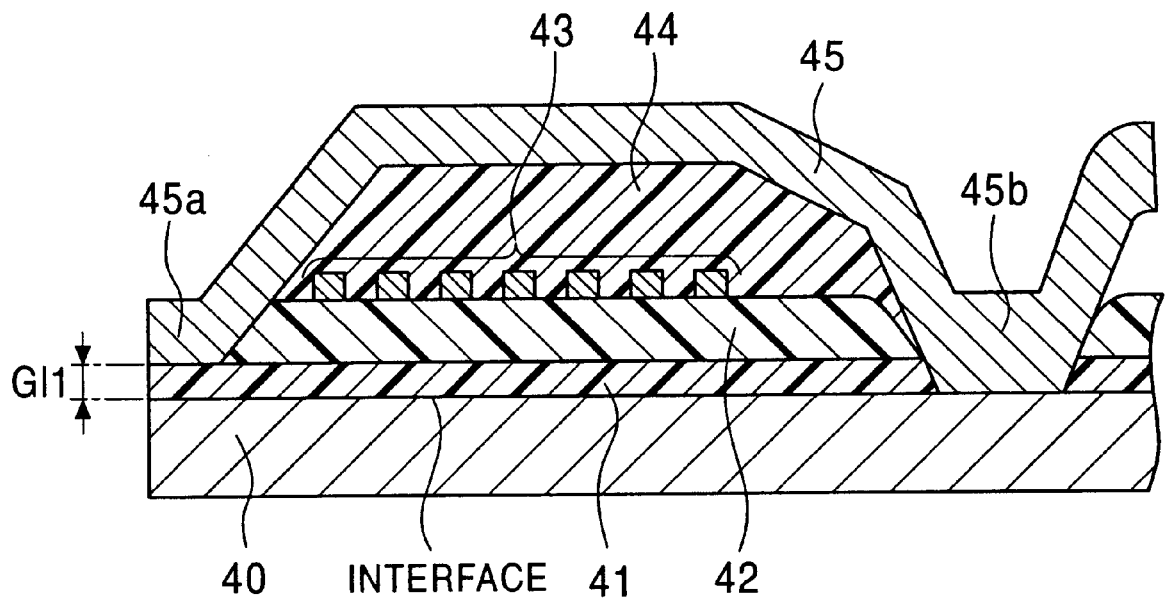
FIG. 4 is a partial sectional view of a thin film magnetic head according to a second embodiment of the present invention.

FIG. 4 is a longitudinal sectional view of a thin film magnetic head according to another embodiment of the present invention. In the thin film magnetic head shown in FIG. 4, the left end surface shown in the drawing is the surface facing the recording medium.

In this embodiment, a gap layer 41 made of a nonmagnetic metal material is formed by plating on a lower core layer 40.

In the present invention, NiP is selected as the nonmagnetic metal material, and the content of element P is set to 8% by mass to 15% by mass, preferably 10% by mass to 15% by mass, and more preferably 11% by mass to 15% by mass, within a thickness of 10 nm, preferably 40 nm, from the interface with the lower core layer 40.

Therefore, crystallization of element Ni due to epitaxial growth can be suppressed within the thickness of 10 nm from the interface with the lower core layer 40, thereby causing an amorphous state containing element P in the above-described numerical range. As a result, corrosion resistance and smoothness at the interface can be improved to avoid corrosion with the cleaning liquid in the slider manufacturing process, thereby suppressing the occurrence of cracks near the interface of the gap layer 41, unlike the conventional magnetic head. Since the gap layer 41 containing the element P can be appropriately promoted in demagnetization near the interface, the thin film magnetic head having the constant gap length G1 can be manufactured in high yield.

The average content of element P of the gap layer 41 over its entire thickness is preferably 11% by mass to 15% by mass. This can bring the gap layer 41 over its entire thickness into an amorphous state containing a proper amount of element P, thereby improving corrosion resistance and securely producing a leakage magnetic field near the gap.

As described above with reference to FIG. 1, the content of element P is measured by the method in which the content measured by the X-ray analysis apparatus is corrected to an absolute value by wet analysis, and the distance from the interface is measured by using the transmission electron microscope.

In FIG. 4, a coil layer 43 is patterned in a spiral planar shape on the gap layer 41 with an insulating layer 42 made of polyimide or a resist material provided therebetween. The coil layer 43 is made of a nonmagnetic conductive material having low electric resistance, such as Cu (copper) or the like.

Furthermore, the coil layer 43 is surrounded by an insulating layer 44 made of polyimide or a resist material, and an upper core layer 45 made of a soft magnetic material is formed on the insulating layer 44.

As shown in FIG. 4, the tip end 45a of the upper core layer 45 is opposed to the lower core layer 40 with the gap layer 41 provided therebetween at the surface facing the recording medium to form a magnetic gap having gap length G11. The base end 45b of the upper core layer 45 is magnetically connected to the lower core layer 40.

Although the saturation magnetic flux density Ms of the lower core layer 40 is preferably high, the saturation magnetic flux density Ms is made lower than that of the upper core layer 45 to facilitate reversal of magnetization of the leakage magnetic field between the lower core layer 40 and the upper core layer 45, thereby further increasing the signal writing density of the recording medium.

The method of manufacturing the thin film magnetic head having the same shape as FIG. 1 will be described with reference to the drawings.

Figure 5:
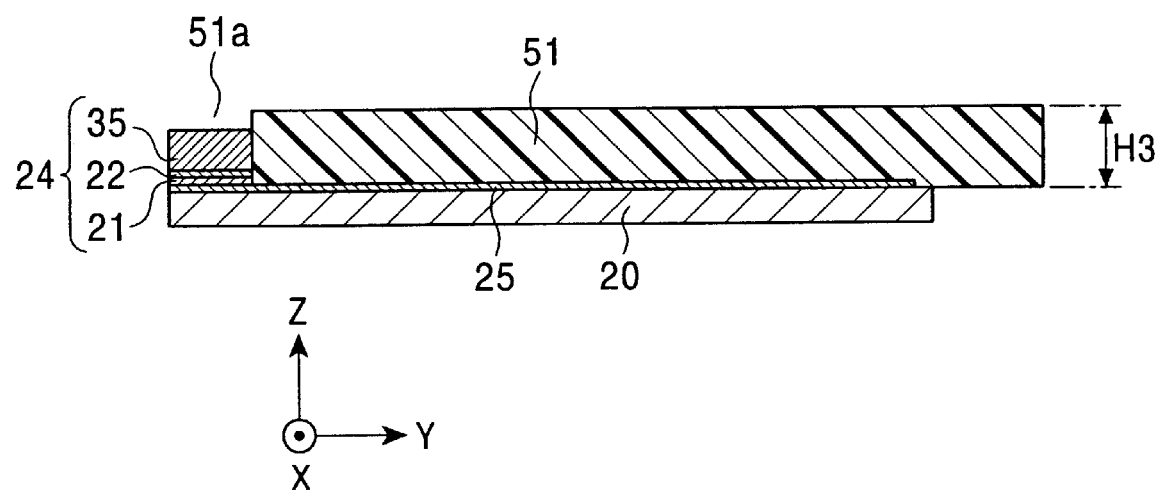
FIG. 5 is a drawing showing a step of a method of manufacturing the thin film magnetic head shown in FIGS. 1 to 3.

In FIG. 5, a resist layer 51 is coated on the lower core layer 20. The thickness dimension H3 of the resist layer 51 must be larger than the thickness dimension of at least the pole portion 24 in the completed thin film magnetic head shown in FIG. 1.

Next, a trench 51a is formed in the resist layer 51 by an exposure phenomenon so as to have a predetermined length dimension in the height direction (the Y direction shown in the drawing) from the surface facing the recording medium, and a predetermined width direction in the track width direction (the X direction shown in the drawing), and the pole portion 24 is formed in the trench 51a.

As shown in FIG. 5, the pole portion 24 comprises the lower pole layer 21, the gap layer 22 and the upper pole layer 35, which are continuously formed by plating in turn from the bottom on the plating underlying layer 25. This can simplify the manufacturing process.

In the present invention, the gap layer 22 is formed by electroplating with a pulsed current. The gap layer 22 is made of a nonmagnetic material mainly composed of Ni.

In the present invention, the pulsed current is repeatedly turned on and off with a cycle of several seconds at a duty ratio which is preferably set to about 0.1 to 0.5. For example, the pulsed current preferably repeatedly turned on and off in a cycle of 0.5 seconds.

The electroplating process using the pulsed current can provide a time to pass the current and a null time to pass no current during plating of the gap layer 22. In this way, by proving the time in which the current is not passed, nonuniformity in the current density distribution in plating can be ameliorated, as compared with a conventional process using a DC current. Therefore, the gap layer 22 can be slowly formed by plating.

The electroplating process using the pulsed current can decrease the nonuniformity in the current density distribution during plating, thereby preventing crystallization of element Ni by epitaxial growth in the gap layer 22 formed by plating near the interface with the lower pole layer 21 unlike the conventional process. In the present invention, the gap layer 22 can be formed by plating near the interface in an amorphous state containing a relatively large amount of nonmagnetic element, as compared with a conventional gap layer.

Therefore, the vicinity of the interface of the gap layer 22 is brought into the amorphous state containing a proper amount of nonmagnetic element, and thus the gap layer can be improved in corrosion resistance and smoothness near the interface thereof. Also, demagnetization near the interface can be promoted.

In the present invention, preferably, the gap layer 22 is first formed by plating to a predetermined thickness using the pulsed current having a predetermined current density, and then the residue of the gap layer 22 is formed by plating using the pulsed current having a current density higher than the predetermined current density.

As a result, the gap layer 22 can be formed by plating in the amorphous state containing much element P in the initial stage, thereby suppressing crystallization of element Ni due to epitaxial growth. Therefore, the corrosion resistance and smoothness of the gap layer can be improved near the interface between the gap layer 22 and the lower pole layer 21, and demagnetization can also be promoted.

After the gap layer 22 is formed by plating to the predetermined thickness using the pulsed current having the predetermined current density, the residue of the gap layer is formed by plating using the pulsed current having a current density higher than the predetermined current density, thereby permitting the residue of the gap layer 22 to be rapidly formed by plating. Therefore, the gap layer 22 can be formed by plating within a short time. Since the gap layer previously formed by plating in the initial stage is in the amorphous state containing a proper amount of nonmagnetic element, the residue of the gap layer 22 can be accordingly formed by plating in the amorphous state containing a proper amount of nonmagnetic element. Namely, in the present invention, the entire gap layer 22 can be formed in the amorphous state containing a proper amount of nonmagnetic element.

In the present invention, preferably, the predetermined current density is 1.5 mA/cm$^2$ to 3.0 mA/cm$^2$, and the gap layer 22 is first formed by plating to the thickness of 10 nm using the pulsed current having this current density. More preferably, the gap layer 22 is first formed by plating to the thickness of 40 nm. In this plating, the plating time is about 7 to 15 minutes. The ON/Off duty ratio is, for example, 0.5 second cycle. The current value must be determined according to the current density. For example, the current value is about 40 mA to 70 mA.

For example, when NiP is selected for the gap layer 22, the region of 10 nm thick, preferably 40 nm thick, from the interface between the gap layer 22 and the lower pole layer 21 can be formed by plating in the amorphous state containing 8% by mass to 15% by mass of element P, thereby suppressing crystallization of element Ni due to epitaxial growth. Therefore, within the thickness of 10 nm, preferably 40 nm, from the interface, the corrosion resistance and smoothness of the gap layer 22 can be improved, and demagnetization can also be promoted.

With the current density of less than 1.5 mA/cm$^2$, the plating growth rate of the gap layer 22 is very low, thereby undesirably failing to appropriately form the gap layer 22 by plating. With the current density of over 3.0 mA/cm$^2$, the plating growth rate of the gap layer 22 is very high, thereby promoting crystallization of element Ni due to epitaxial growth at the interface to fail to contain a proper amount of element P. This undesirably causes deterioration in corrosion resistance, and magnetization.

In the present invention, the gap layer 22 is formed to 10 nm or 40 nm by plating growth using the pulsed current having the above current density, and then the residue of the gap layer 22 is formed by plating using the pulsed current having the current density of 8.5 mA/cm$^2$ to 11.0 mA/cm$^2$. As a result, the residue of the gap layer 22 can be rapidly formed by plating, thereby shortening the plating time of the gap layer 22. Although the plating time depends upon the desired final thickness, the plating time is, for example, about 7 minutes to 8 minutes. The ON/Off duty ratio is, for example, 0.5 second cycle. The current value must be determined according to the current density. For example, the current value is about 200 mA to 250 mA.

Consequently, the average content of element P of the gap layer 22 over its entire thickness can be set to 11% by mass to 15% by mass, and the corrosion resistance and demagnetization of the entire gap layer 22 can be improved.

Application of the manufacturing method comprising electroplating with the pulse current is not limited to the formation of the gap layer 22 using Ni—P. Besides Ni—P, the gap layer 22 can be formed by plating any one of Ni—W, Ni—P—Mo, and Ni—P—W. In this case, the gap layer 22 can also be formed by electroplating with the pulsed current. Therefore, when any one of Ni—W, Ni—P—Mo and Ni—P—W is used, the amorphous state, which contains the nonmagnetic element, i.e., element W, elements P and Mo or elements P and W, in a proper amount, can be obtained near the interface with the lower pole layer 21, thereby improving the corrosion resistance and smoothness of the gap layer 22 and promoting demagnetization.

The electroplating process using the pulsed current may be used for plating each of the magnetic layers such as the lower core layer 20, the lower pole layer 21, the upper pole layer 35 and the upper core layer 26. This suppresses coarsening of crystal grains, and smoothens the upper surface of the each of the magnetic layers. Therefore, the saturation magnetic flux density of each of the magnetic layers can be improved. Particularly, the lower pole layer 21 is preferably formed by electroplating with a pulsed current. This can appropriately suppress crystallization of element Ni due to epitaxial growth at the interface between the lower pole layer 21 and the gap layer formed on the lower pole layer 21 to obtain the amorphous state containing much nonmagnetic element, thereby further improving corrosion resistance and demagnetization.

The film structure of the pole portion 24 formed in the trench 51a shown in FIG. 2 is not limited to the three-layer structure. Namely, the pole portion 24 may have any film structure as long as it comprises the lower pole layer 21 connected to the lower core layer 20 and/or the upper pole layer 35 connected to the upper core layer 26, and the gap layer 22 formed between either of the upper and lower core layers 26 and 20 and the corresponding pole layer or between the lower and upper pole layers 21 and 35.

Figure 6:
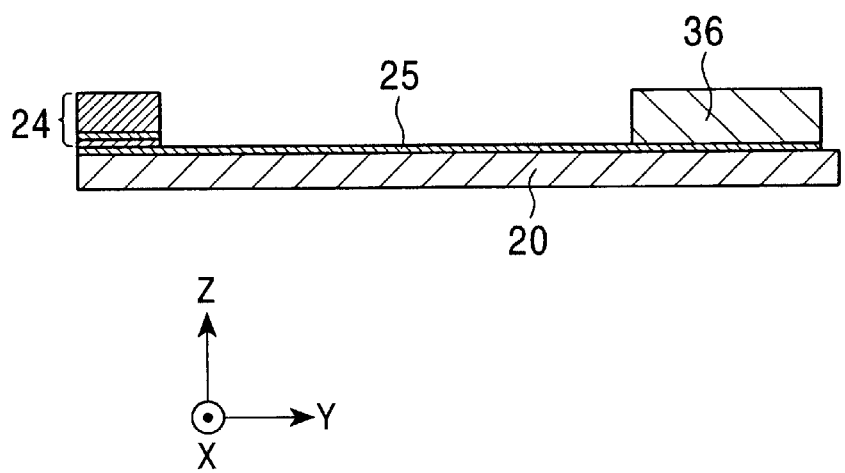
FIG. 6 is a drawing showing the step after the step shown in FIG. 5.

Next, in FIG. 5, the resist layer 51 is removed, and a new resist layer is formed and patterned in an aperture shape for forming the raised layer 36. Then, the raised layer 36 is formed in the aperture pattern (refer to FIG. 6).

Figure 7:
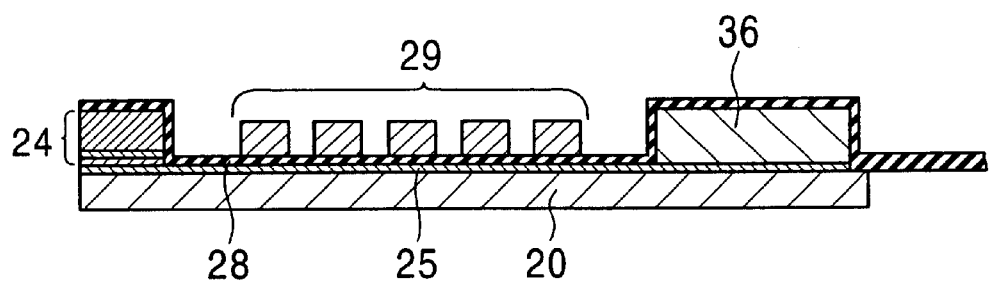
FIG. 7 is a drawing showing the step after the step shown in FIG. 6.

Next, in the step shown in FIG. 7, the insulating underlying layer 28 made of an insulating material is formed by sputtering to extend on the pole portion 24, the lower core layer 20 and the raised layer 36 in the height direction.

Then, as shown in FIG. 7, the coil layer 29 is spirally patterned on the insulating underlying layer 28.

Figure 8:
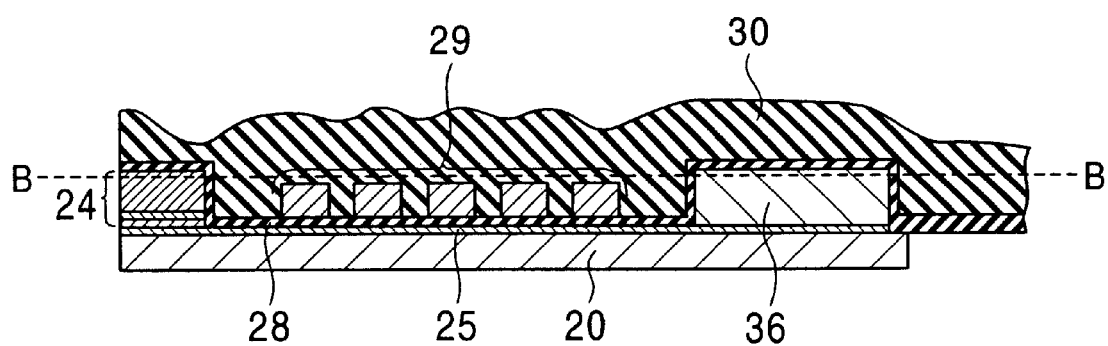
FIG. 8 is a drawing showing the step after the step shown in FIG. 7.

Next, in the step shown in FIG. 8, the insulating layer 30 is coated on the coil layer 29. In this step, the insulating layer 30 is also coated on the pole portion 24 and the raised layer 36.

In this embodiment, the insulating layer 30 is formed by sputtering an inorganic material. As the inorganic material, at least one is preferably selected from Al$_2$O$_3$, SiN, SiO$_2$.

Figure 9:
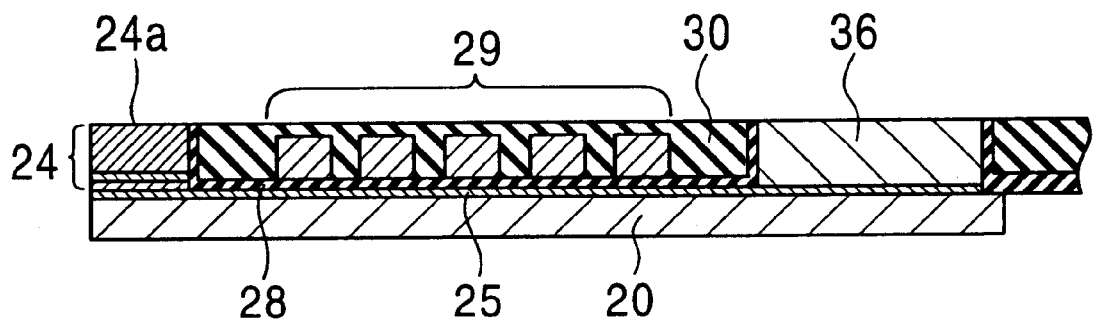
FIG. 9 is a drawing showing the step after the step shown in FIG. 8.

As shown in FIG. 8, the surface of the insulating layer 30 is polished to line B—B by a CMP technique to expose the surface of the pole portion 24. This state is shown in FIG. 9.

By the CMP process, the surface of the insulating layer 30 is planarized to a surface coplanar with the junction surface 24a of the pole portion 24.

Figure 10:
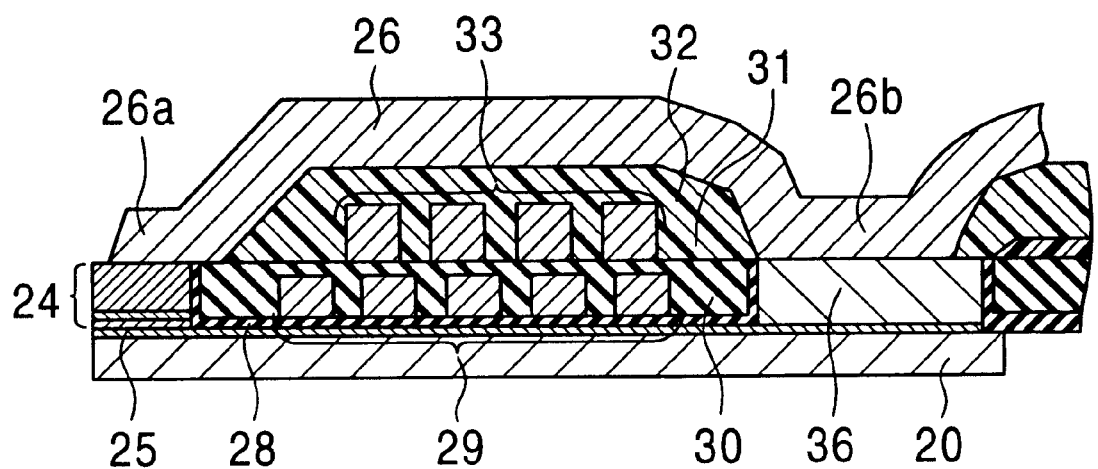
FIG. 10 is a drawing showing the step after the step shown in FIG. 9.

Next, as shown in FIG. 10, the second coil layer 33 is spirally patterned on the insulating layer 30. The second coil layer 33 is electrically connected to the first coil layer 29 through the coil centers thereof. Furthermore, the second coil layer 33 is coated with the insulating layer 32 made of an organic insulating material such as resist, polyimide, or the like, and the upper core layer 26 is patterned on the insulating layer 32 by a known method such as a frame plating method or the like.

As shown in FIG. 10, the upper core layer 26 is formed so that the tip portion 26a is in contact with the pole portion 24, and the base end 26b is magnetically connected to the raised layer 36 formed on the lower core layer 20.

EXAMPLES

In the present invention, a gap layer was formed by electroplating using a pulsed current in an example, and a gap layer was formed by electroplating using a DC current in a comparative example, and the surface state each of the gap layers was examined with a transmission electron microscope (TEM).

In the example, a lower pole layer comprising a NiFe alloy was formed as a lowermost layer by electroplating using a pulsed current. The composition of the NiFe alloy comprised 70% by mass of Fe and the balance of Ni. The pulsed current used for forming the lower pole layer by plating was 4000 mA.

Next, the gap layer composed of NiP was formed on the lower pole layer by electroplating with a pulsed current. The composition of the plating bath used comprised 100 g/l of nickel sulfate, 30 g/l of nickel chloride, and 30 g/l of sodium hydrogen phosphate.

The gap layer was first formed by plating with a pulsed current of 50 mA for 10 minutes. The current density of the pulsed current was 2.2 mA/cm², and the ON/OFF duty ratio was 0.5 second cycle. The thus-formed gap layer had a thickness of 40 nm.

Next, the residue of the gap layer was formed by plating with a pulsed current of 250 mA for 7 to 8 minutes. The current density of the pulsed current was 10.9 mA/cm², and the ON/OFF duty ratio was 0.5 second cycle. When plating was finished, the gap layer had a total thickness of 200 nm.

Then, an upper pole layer composed of NiFe was formed on the gap layer by electroplating using a pulsed current of 4000 mA. The NiFe composition of the upper pole layer comprised 70% by mass of Fe and the balance of Ni.

In the comparative example, a lower pole layer comprising a NiFe alloy was formed as a lowermost layer by electroplating using a pulsed current of 4000 mA. The composition of the NiFe alloy comprised 70% by mass of Fe and the balance of Ni.

Next, the gap layer composed of NiP was formed on the lower pole layer by electroplating with a DC current of 70 mA. The composition of the plating bath used was the same as the example. Then, an upper pole layer composed of NiFe was formed on the gap layer by electroplating using a pulsed current of 4000 mA.

Figure 11:
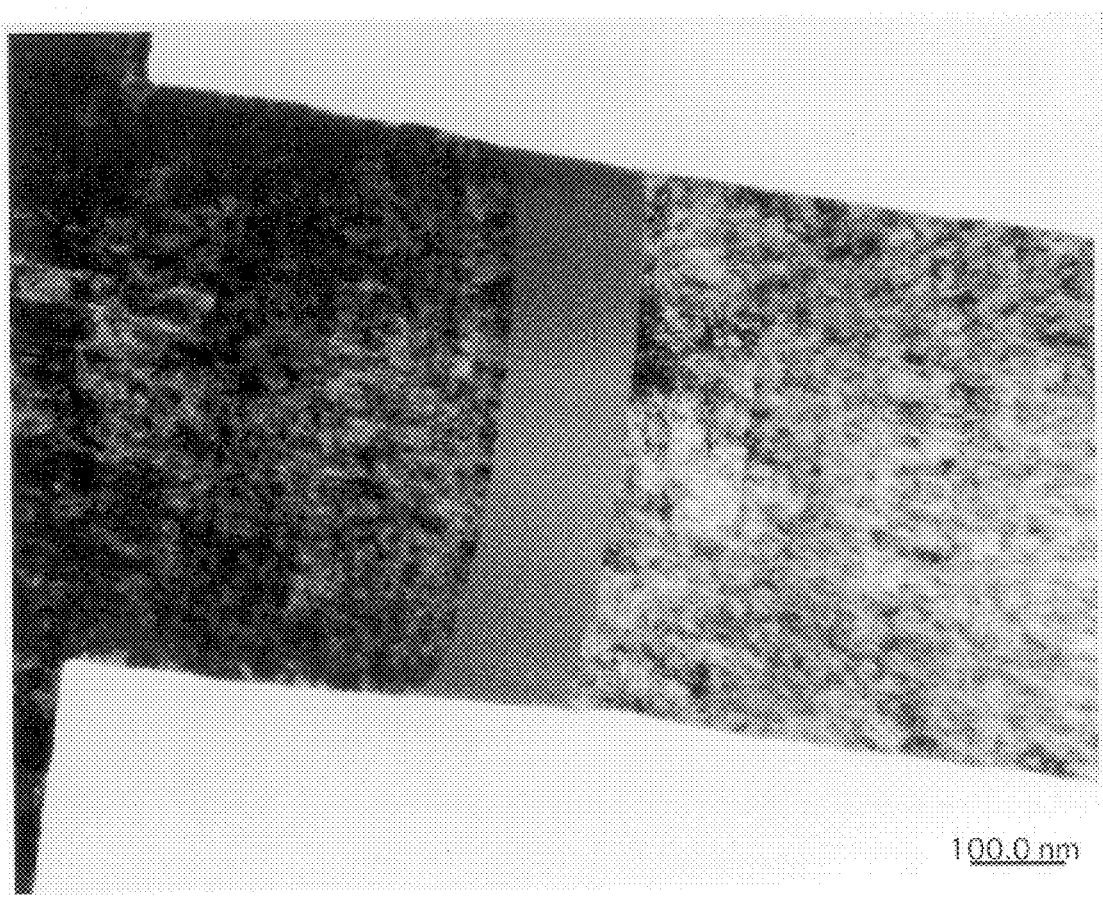
FIG. 11 is a transmission electron microscope photograph of a pole portion (an example) of the present invention in which a gap layer is formed by electroplating with a pulsed current.
Figure 12:
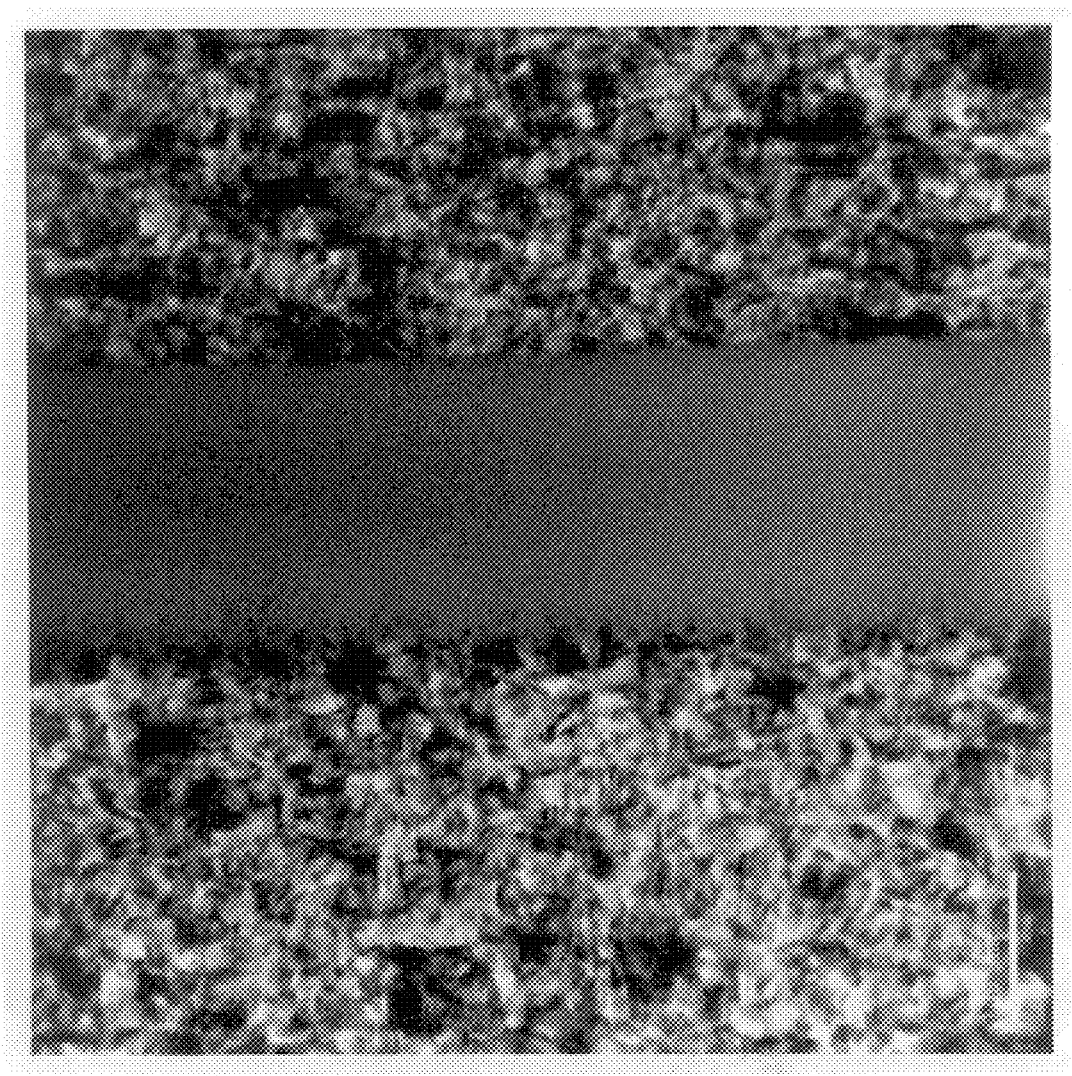
FIG. 12 is a transmission electron microscope photograph of a conventional pole portion (a comparative example) in which a gap layer is formed by electroplating with a DC current.

FIGS. 11 and 12 are transmission electron microscope photographs of the example and the comparative example, respectively.

In the example shown in FIG. 11, the interface between the gap layer and the lower pole layer is smoothed, and black spots are observed in the upper and lower pole layers, but not in the gap layer. The black spots observed in the upper and lower pole layers indicate crystals. Namely, it can be recognized that in the example, the gap layer is wholly in an amorphous state without a crystallized portion.

On the other hand, in the comparative example, the interface between the lower pole layer and the gap layer is roughened, and black spots are observed in the gap layer near the interface. It is thus recognized that component element Ni of the gap layer is crystallized by epitaxial growth.

As described above, electroplating using a pulsed current can form the gap layer in an amorphous state, particularly, at the interface with the lower pole layer to suppress crystallization of Ni, as compared with electroplating using a DC current.

Next, the relation between the content of element P and the distance from the interface between the gap layer and the lower pole layer was examined by using the film structure of the example, which was formed by electroplating with the pulsed current, and the film structure of the comparative example, which was formed by electroplating with the DC current. The distance from the interface was measured by using a transmission electron microscope, and the content of element P was measured by an X-ray analysis apparatus (corrected by wet analysis). The results are shown in FIG. 13.

Figure 13:
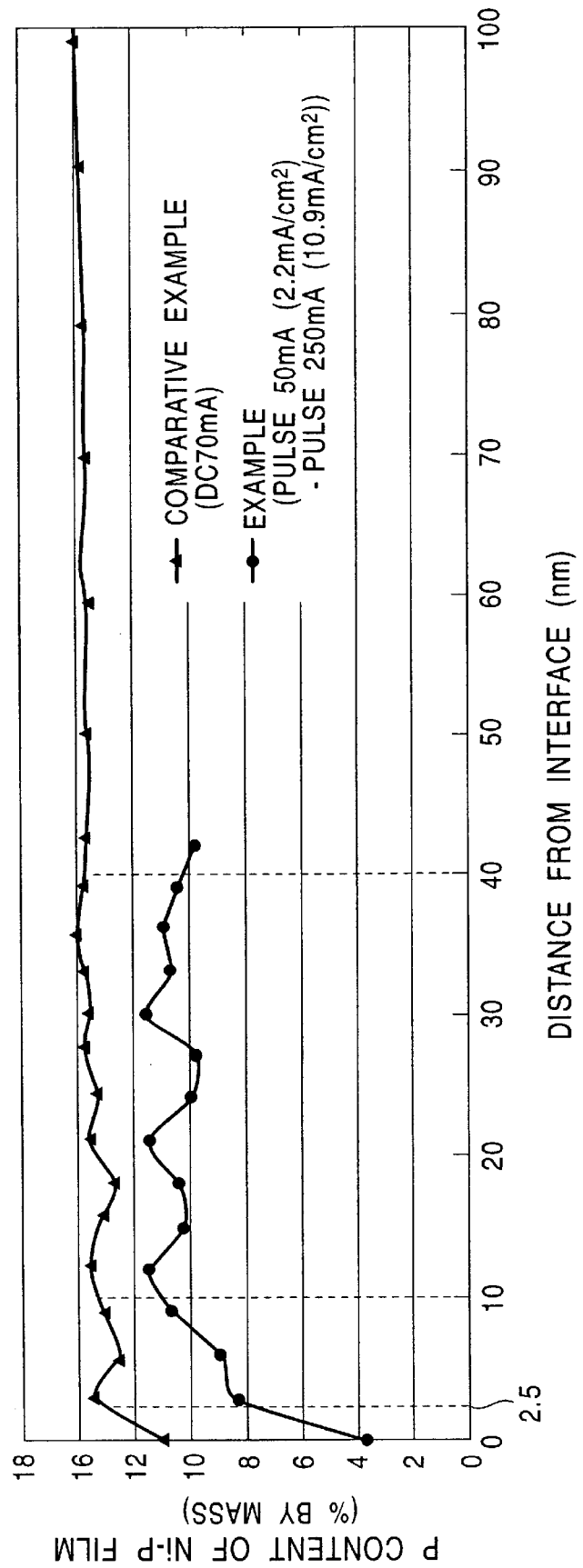
FIG. 13 is a graph showing the relation between the distance from the interface of NiP and the content of element P in each of an example and a comparative example.
Figure 14:
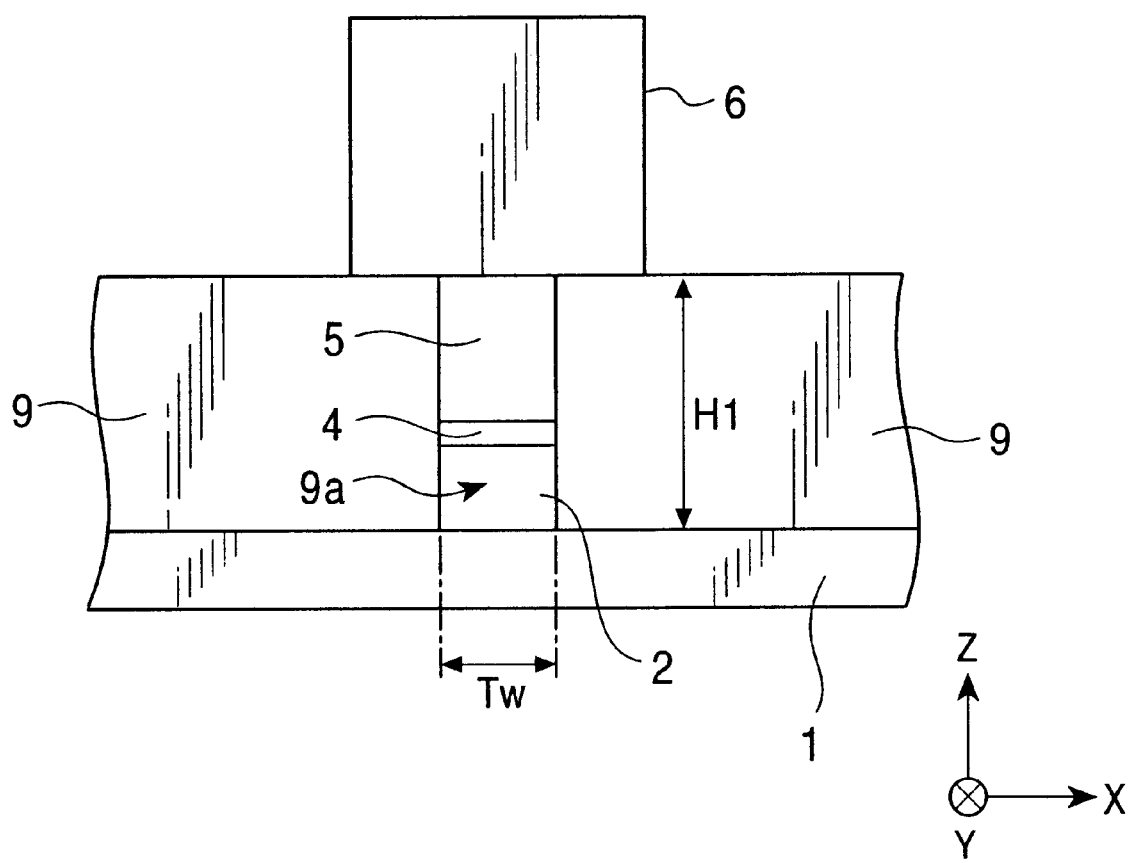
FIG. 14 is a partial front view showing the structure of a conventional thin film magnetic head.

FIG. 13 indicates that in the comparative example, the content of element P is as low as 8% by mass or less within a distance of about 2.5 nm from the interface. On the other hand, in the example, the content of element P is 8% by mass or more within a distance of 10 nm from the interface, and within a distance of 40 nm from the interface. It is thus found that in the example, the content of element P at the interface can be increased, as compared with the comparative example. In the example, electroplating was performed with a current density of 2.2 mA/cm² for 10 minutes within a distance of 40 nm from the interface.

In the comparative example, the content of element P is over 8% by mass when the distance from the interface exceeds about 2.5 nm. However, the graph of FIG. 13 shows that the upper limit of the content is 12% by mass at most, and that the content of element P is not kept constant and greatly varies when the distance from the interface increases.

On the other hand, in the example, the content of element P is kept substantially constant regardless of the distance from the interface. In the example, the average content of element P over the entire thickness is about 13% by mass. Therefore, in the present invention, the average content of element P is preferably in the range of 11% by mass to 15% by mass. With the content of element P within this range, the corrosion resistance of the whole gap layer can be improved, and demagnetization can be promoted.

When the content of element P is extremely low, particularly, near the interface, as in the comparative example, crystallization of element Ni is promoted in the vicinity of the interface to deteriorate corrosion resistance, as shown in FIG. 12. Therefore, the gap layer is easily corroded with a neutral or alkali cleaning solution. In addition, the content of element Ni is extremely high near the interface to magnetize the gap layer, and thus the gap layer possibly does not function near the interface.

In the example, the content of element P can be maintained at 8% by mass or more within a distance of 10 nm, preferably 40 nm, from the interface, thereby promoting the formation of the amorphous state near the interface to improve corrosion resistance, as shown in FIG. 11. In addition, by ensuring not less than 8% by mass of element P, demagnetization at the interface can be appropriately promoted. In the present invention, the upper limit of the content of element P is set to 15% by mass or less. This is because even if the amount of element P in the plating bath is increased, the P content in plated NiP does not exceed 15% by mass. The P content is preferably in the range of 10% by mass to 15% by mass, and more preferably in the range of 11% by mass to 15% by mass. This content can appropriately improve corrosion resistance and demagnetization near the interface of the gap layer. In FIG. 13, the example satisfies the preferred range and the more preferred range.

In the present invention, the current density is preferably 1.5 mA/cm² to 3.0 mA/cm² within a distance of 10 nm, preferably 40 nm, from the interface. In the example shown in FIGS. 11 and 13, the initial current density was 2.2 mA/cm². Although the magnitude of the current must be controlled according to the current density in the above range, in the present invention, the current is 40 mA to 70 mA, for example.

The current density used for plating the residue of the gap layer is preferably 8.5 mA/cm² to 11.0 mA/cm². In the example shown in FIGS. 11 and 13, the current density used for plating the residue of the gap layer was 10.9 mA/cm². In this case, although the magnitude of the current must be controlled according to the current density in the above range, in the present invention, the current is 220 mA to 250 mA, for example.

As described in detail above, in the present invention, NiP is used for forming a gap layer of a thin film magnetic head, and the content of element P is 8% by mass to 15% by mass within a distance of 10 nm from the interface with a lower pole layer or a lower core layer. Therefore, within a distance of 10 nm from the interface, crystallization of element Ni due to epitaxial growth can be suppressed to obtain an amorphous state containing much element P. Thus, the corrosion resistance of the gap layer can be improved near the interface, and thus corrosion of the gap layer can be appropriately prevented even when the gap layer is exposed to a neutral or alkali solution.

By ensuring the above content of element P, demagnetization near the interface can be promoted.

In the present invention, therefore, a thin film magnetic head having excellent and constant recording performance can be manufactured in high yield.

The manufacturing method of the present invention comprises forming the gap layer by electroplating using a pulse current to suppress crystallization of element Ni due to epitaxial growth near the interface of the gap layer. Therefore, a large amount of nonmagnetic element such as P or the like can be contained near the interface, and the vicinity of the interface can be put into an amorphous state to improve corrosion resistance.

In the present invention, preferably, the gap layer is first formed by plating to a predetermined thickness using a pulsed current having a low current density, and then plating with a current density higher than the first current density. This can improve the corrosion resistance and demagnetization of the whole gap layer, and speed up the formation of the gap layer.

What is claimed is:

1. A thin film magnetic element comprising a lower core layer, a gap layer formed on the lower core layer one of directly and through a lower pole layer, and an upper core layer formed on the gap layer one of directly and through an upper pole layer which determines a track width;

wherein the gap layer is formed by plated NiP, with P being 8% by mass to 15% by mass within a distance of 10 nm from an interface with one of the lower pole layer and the lower core layer in a thickness direction.

2. A thin film magnetic head according to claim 1, wherein P is 8% by mass to 15% by mass within a distance of 40 nm from the interface.

3. A thin film magnetic head according to claim 1, wherein P is 10% by mass to 15% by mass.

4. A thin film magnetic head according to claim 1, wherein P is 11% by mass to 15% by mass.

5. A thin film magnetic head according to claim 1, wherein an average content of P of the gap layer over an entire thickness of the gap layer is 11% by mass to 15% by mass.

* * * * *